June 9, 1964   F. H. LASTER   3,136,374
MOLDBOARD PLOW ATTACHMENT
Filed Sept. 18, 1961

INVENTOR.
FLOYD H. LASTER
BY W. B. Harpman
ATTORNEYS

United States Patent Office 3,136,374
Patented June 9, 1964

3,136,374
MOLDBOARD PLOW ATTACHMENT
Floyd H. Laster, Farmdale, Ohio
Filed Sept. 18, 1961, Ser. No. 138,731
2 Claims. (Cl. 172—759)

This invention relates to a plow and more particularly to an attachment for a plow for modifying the shape thereof and insuring complete coverage of stalks and stubble remaining from previous crops.

The principal object of the invention is the provision of a plow attachment that insures complete coverage of stalks, stems and stubble from previous crops.

A further object of the invention is the provision of a simple and inexpensive attachment for a flow for guiding the ground being turned by the plow and insuring its complete turning into the furrow as the plow progresses.

A further object of the invention is the provision of a plow modifying attachment including an adjustable arcuate member extending outwardly and downwardly with respect to the plow and defining a guide against which ground being turned by the plow is directed and guided.

The attachment for a plow shown and described herein comprises an improvement in the art generally relating to shin plates, and moldboards and the like as found on plows.

In plows heretofore known in the art the moldboard has been provided in an upwardly and rearwardly curving arcuate shape so that the ground being turned by the plow follows the upwardly and rearwardly inclined surface with the result that it generally turns partially or completely to fall on a path parallel with the furrow from which it is being cut. Those skilled in the art will recognize that frequently the ground being turned by the plows fails to follow the desired path so that the ground cover of crop being plowed under is not completely covered. The present invention eliminates this possibility and insures the accurate and positive placement of the plowed ground so that it completely covers the ground crop or material being plowed under.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
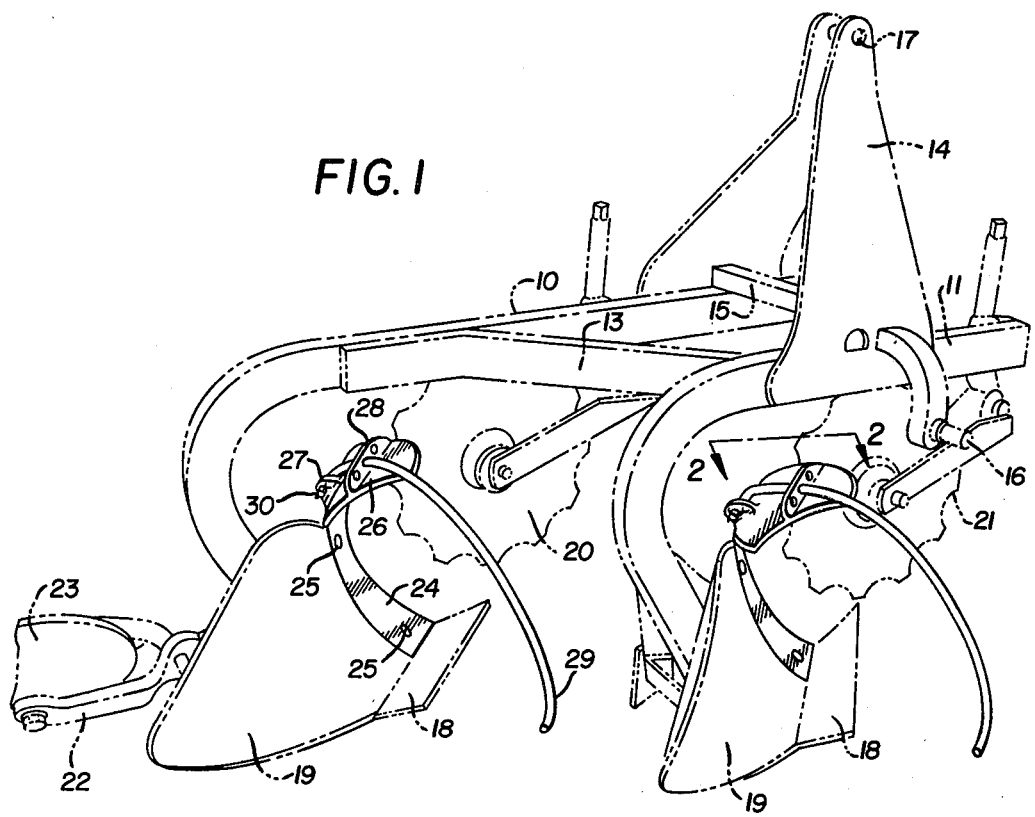
FIGURE 1 is a perspective view of a gang plow carrying two plows and showing the ground turning attachment applied to each of said plows.
Figure 2:
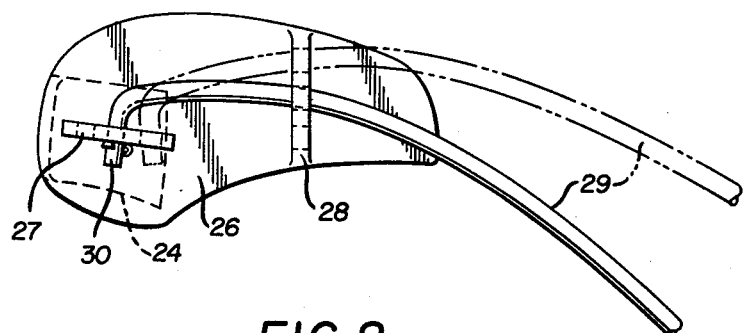
FIGURE 2 is an enlarged top plan view of the ground turning attachment showing the manner in which a portion thereof is adjustably mounted thereon.

By referring to the drawings and FIGURE 1 in particular, it will be seen that a two gang plow is disclosed which is adapted for mounting on the three-point hitch of a farm tractor and that the arrangement includes a pair of plow beams 10 and 11, a connecting rigid frame work 11 and an elevated two-part body member 14 mounted thereon. A cross piece 15 extends across the plow beams 10 and 11 and outwardly through the sides of the two-part frame member 14 and has oppositely disposed pins 16 thereon which with apertures 17 in the two-part body member 14 comprise the three suspension points of the device when it is attached to a farm tractor to be moved thereby. The plow beams 10 and 11 curve downwardly at their rearmost ends and directly carry plow points 18, 18 and moldboards 19, 19 which comprise conventional plow and moldboard constructions as so known in the art. The plow beams 10 and 11 also carry trailing arms with coulters 20 and 21 thereon and the rearmost end of the plow beam 10 has a bifurcated extension 22 thereon rotatably mounting a curved disc 23 as also known in the art. Each of the plows formed by the points 18 and moldboards 19 is provided with a ground turning attachment comprising an elongated longitudinally curved member 24 apertured for receiving fasteners by which it is secured to the leading edge of the mold board 19 and the upper rear edge of the plow point 18 in the location usually occupied by the shin plate. Such fasteners may comprise bolts or rivets and are indicated by the numeral 25. The uppermost curved end of the elongated curved body member 24 is widened in a spade-like blade 26 which in turn is provided with an apertured boss 27 on one end thereof and the uppermost curved end of the elongated curved body member is turned at an angle to the transverse plane of the remainder thereof so that its leading edge substantially follows the radius of the curved body member while its trailing edge bends forwardly progressively to a point where its transverse section approximately is 45% from the transverse section of the curved body member where it is secured to the plow. A transversely positioned apertured bracket 28 is positioned adjacent the opposite upper outermost end of the blade 26. A longitudinally curved rod 29 is positioned through one of the apertures in the bracket 28 and has a right angular end portion 30 which is positioned through the apertured boss 27 and secured in a position by a cotter pin. The elongated curved body member 24 including the upper spade-shaped blade 26 thereof and the curved rod 29 extending therefrom form approximately 80% of a complete circle, the plane of which is inclined from vertical and disposed at a substantial right angle to the plane of the leading edge of the moldboard 19. The ground being plowed by the plow point 18 and shaped and rolled upwardly by the moldboard 19 will engage and follow the elongated curved body member 24 and the upper portion of the turned ground will engage the widened spade-like blade 26 of the elongated body member 24 and thereby be directed in an upwardly and outwardly and downwardly curving arc insuring the complete inversion of the plowed ground. The upper surface of the ground being plowed is therefore inverted and the elongated curved member 24, its spade-shaped blade 26 and the extending rod 29 slidably engage the back or former lower surface of the plowed ground and guide it as it turns over completely to lie in a path parallel to the furrow being plowed. It will therefore be seen that the attachment insures the complete turning of the ground by presenting a continually present guiding surface whereas without the same the material being plowed simply falls back upon itself by reason of its having risen vertically from the moldboard and falls alongside the furrow or back into the furrow defeating the purpose of the plowing.

It will thus be seen that a ground turning and guiding attachment has been disclosed, which meets the several objects of the invention, and having thus described my invention, what I claim is:

1. The combination of a plow including a point and a moldboard and an attachment secured thereto adjacent said moldboard and on a similar plane, said attachment comprising an elongated transversely flat curved body member extending upwardly away from said point and moldboard and having a widened upper end portion angularly disposed with respect to the transverse plane of the lower portion thereof and adapted to engage the material being plowed and guide it in an upwardly curving motion ahead of and above said moldboard, an outwardly and downwardly curving adjustable guide means extending beyond the upper end of said curved body member, said curving guide means comprising a longitudinally curved rod having a short end section formed at an acute angle thereto, a projecting boss and a projecting bracket positioned on the upper side of said widened upper end portion of said curved body member in spaced relation to one another, said boss and said bracket each having several spaced apertures therein, said boss being positioned axially of said curved body member and the said bracket being positioned transversely of said curved body member, said curved rod being positioned through one of the apertures in said transversely positioned bracket and having its short end section positioned in one of the apertures in said longitudinally positioned boss and removably secured thereto.

2. The combination set forth in claim 1 and wherein the majority of the longitudinally curved rod extends outwardly and downwardly from said curved body member on a radius matching the radius of said curved body member.

References Cited in the file of this patent

UNITED STATES PATENTS

| | | |
|---|---|---|
| 901,193 | Sawatzky | Oct. 13, 1908 |
| 1,137,646 | McDowell | Apr. 27, 1915 |
| 2,733,647 | Bauer | Feb. 7, 1956 |

FOREIGN PATENTS

| | | |
|---|---|---|
| 16,477 | Great Britain | Nov. 14, 1891 |